Feb. 2, 1971  J. I. MOSS ET AL  3,560,854
PULSE ACTUATED SPEED RESPONSIVE SYSTEM
Filed Oct. 16, 1967  3 Sheets-Sheet 3

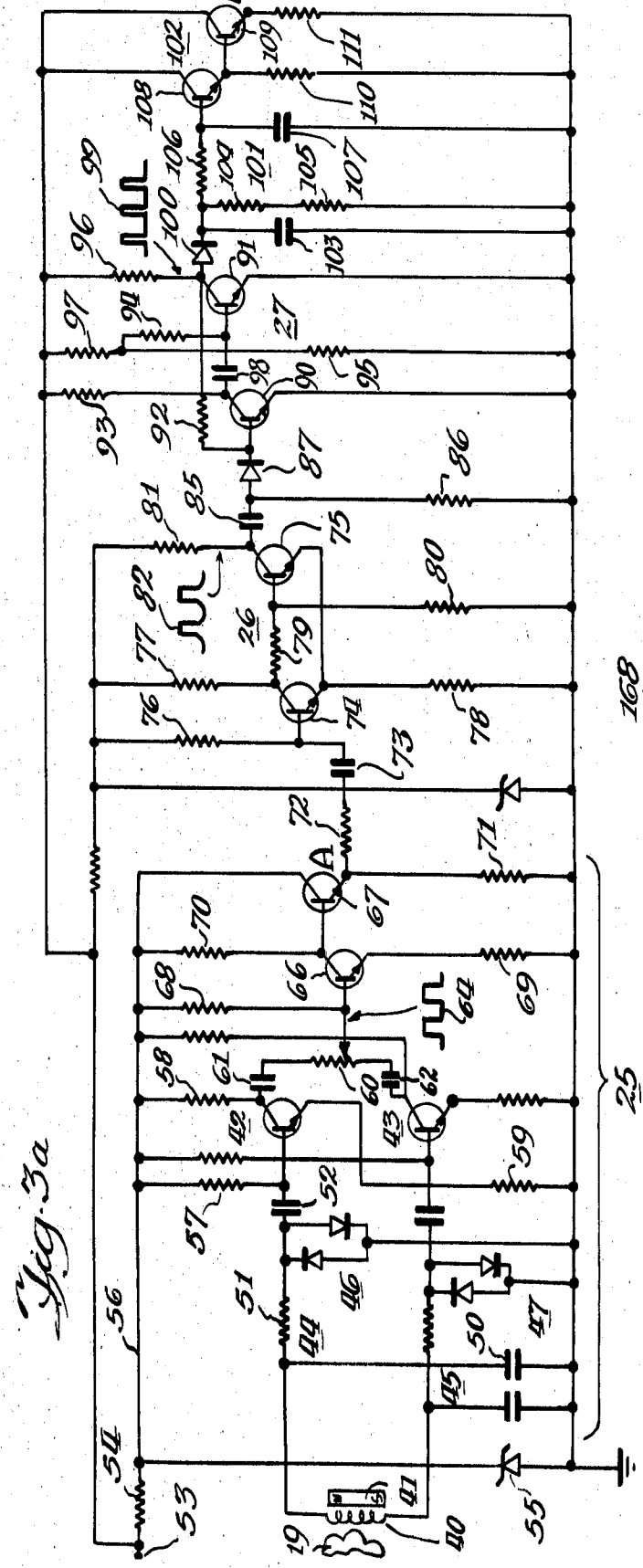

United States Patent Office 3,560,854
Patented Feb. 2, 1971

3,560,854
PULSE ACTUATED SPEED RESPONSIVE SYSTEM
John I. Moss and Fred R. Wright, Skokie, and Walter Jaskiewicz, Chicago, Ill., assignors to John I. Moss, Inc., a corporation of Illinois
Filed Oct. 16, 1967, Ser. No. 675,511
Int. Cl. G01p 3/48
U.S. Cl. 324—174                          6 Claims

ABSTRACT OF THE DISCLOSURE

A system which converts speed related pulses developed in a magnetic pickup to a variable amplitude DC voltage to control speed responsive functions. A noise filter, trigger and monostable multivibrator eliminate interference and produce pulses of uniform shape and at a frequency the same as (or directly related to) the frequency of pulses from the pickup. The produced pulses are rectified to establish a DC voltage having an amplitude directly related to speed. Function detectors respond to different levels of the DC voltage to operate relays indicative of the measured speed. The DC voltage controls the timing ratio of a variable rectangular wave generator, the output of which operates the control valve of a hydraulic speed regulator.

---

This invention relates to a speed responsive system which may be a part of a speed indicator or a speed related control.

Speed measuring systems utilizing a magnetic pickup are well known. Typically, a magnetic pickup includes a coil and a polarizing magnet which are mounted adjacent a rotating part having a discontinuity of magnetic material, as adjacent to the path of movement of the teeth of a gear driven by the shaft for which the speed is to be measured. As the teeth of the gear pass the coil, the magnetic flux linking the coil to the gear is modified, thereby producing pulses. The pulse shape and duration vary considerably with the speed of the shaft. In particular, it is difficult to derive accurate information at low speeds.

A principal object of the invention is the provision of a speed responsive circuit which is accurate throughout a wide range and to provide a speed indicator and other speed related control functions.

One feature of the invention is that the system includes circuitry for re-forming the pulses derived from the pickup coil into pulses of uniform amplitude and time duration, but which vary only in repetition rate.

The generated pulses are rectified, establishing a DC potential which is a function of speed. This potential controls the operation of a plurality of sensing circuits which may be adjusted to respond to various potential levels, i.e., speeds, to perform indicator or control functions.

Yet another feature of the invention is that the speed related DC voltage controls the timing ratio or duty cycle of a fixed frequency rectangular wave generator which in turn operates a hydraulic valve in a speed control system.

Further features and advantages will readily be apparent from the following specification and from the drawings, in which:

FIGS. 3a and 3b are schematic diagram of the circuit of the speed responsive system;

FIG. 5 is a schematic diagram of a modified input amplifier circuit for said system.

During the course of the following description, various elements of the circuit will be identified and assigned specific type designations and values. It is to be understood that this specific information is given solely for the purpose of illustrating an operative embodiment of the invention. Many modifications and substitutions will readily be apparent to those skilled in the art.

Figure 1:
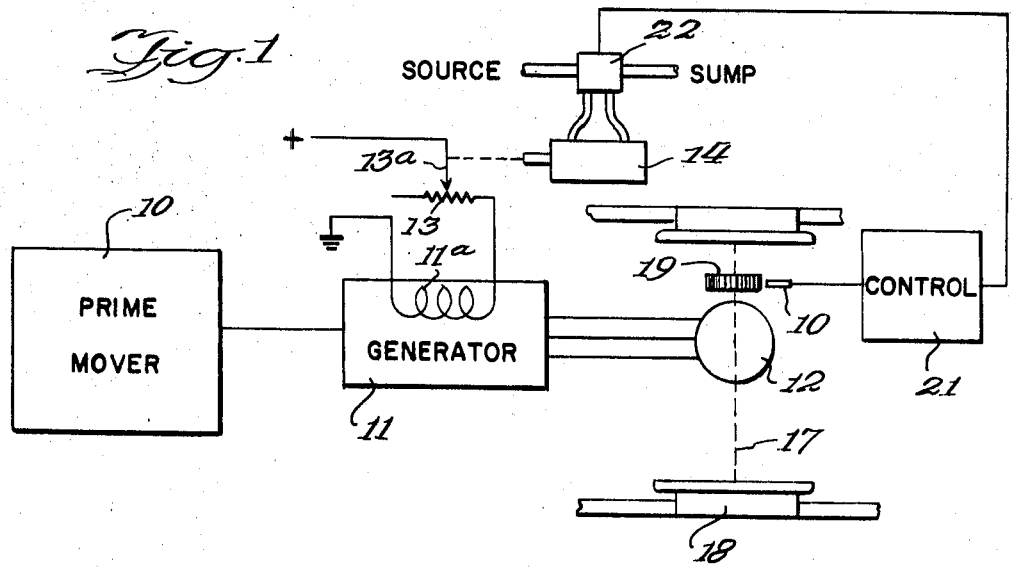
FIG. 1 is a diagrammatic illustration of a locomotive drive utilizing a speed responsive system embodying the invention.

The system is illustrated in FIG. 1 as incorporated in a locomotive drive control. A prime mover 10, which may be a diesel engine, turns generator 11, the output of which is connected to a drive motor 12. The voltage output of the generator and, thus, the torque and speed of the motor are controlled by varying the current in generator field winding 11a. The field current is established by the setting of a control potentiometer 13, the movable arm 13a of which is actuated by a hydraulic piston and cylinder motor 14.

Electric drive motor 12 is connected with the axle 17 for locomotive drive wheels 18. A gear 19 mounted on the axle rotates at a speed related to the locomotive speed.

A magnetic pickup 20 mounted adjacent gear 19 is connected with a control system 21 to be described below, which establishes a rectangular wave having a timing ratio related to the speed. This variable ratio signal is connected with a two-position hydraulic valve 22 operated between its two positions in accordance with the signal. In one position of the valve, one side of the piston is connected with a source of hydraulic fluid and the other side is connected with a sump. In the other position of the valve, the connections of the cylinder to the source and sump are reversed. The position assumed by the piston, and thus the position of the contact of potentiometer 13, at any time, depends on the relative width of the pulses in the output of the control system 21. Valve 22 responds rapidly enough to follow the pulses while piston and cylinder motor 14 responds so slowly that it assumes a position which represents an average condition. The rheostat position and generator voltage do not vary at the repetition rate of the control system output signal.

Figure 2:
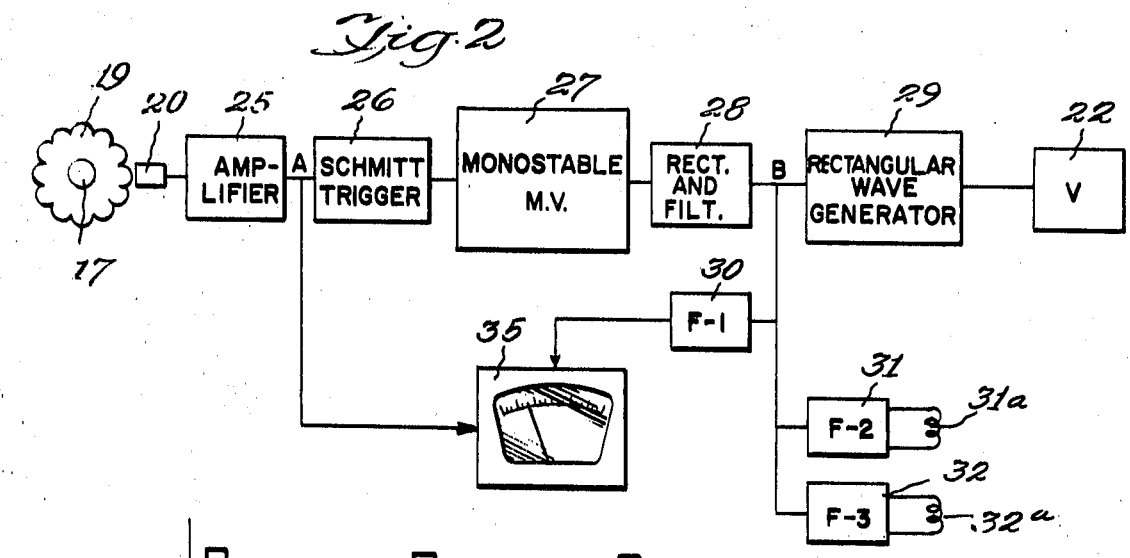
FIG. 2 is a block diagram of the speed responsive system.

The speed responsive control 21 is illustrated in greater detail in block diagram in FIG. 2. The output of magnetic pickup 20, which is a train of pulses representing the passage of the teeth of gear 19 past the end of the pickup, is connected with an amplifier 25. The amplified pulses, which vary both in repetition rate and width, and may also vary in shape, depending on the speed of shaft 17 and the shape of the teeth of the gear, are connected with a Schmitt trigger 26 which has an output of relatively uniform pulses at the same frequency as the pulses from amplifier 25. The output of the Schmitt trigger is utilized to control a monostable multivibrator 27, the output of which is a series of uniform rectangular pulses of constant width but variable repetition rate, representing the speed being measured. The pulses from the multivibrator are connected to a DC potential by rectifier and filter 28, the DC potential providing a control bias for a fixed frequency rectangular wave generator 29, varying the duty cycle, but not the frequency, of the generated wave. The output of generator 29 in turn operates two-position valve 22. The speed indicative DC potential at the output of rectifier and filter 28 is connected with a plurality of amplitude sensitive function detectors 30, 31 and 32. Function detector 30 is connected to vary the operating range of a speed indicating meter 35 which has an input connected with the output of amplifier 25. The meter may, for example, have low and high speed ranges and automatically switch between these ranges in accordance with the direct current potential, although the input to the meter is the pulse signal from amplifier 25.

Function detectors 31 and 32 are indicated as operating relays 31a and 32a which may perform any desired control or signaling operation. For example, energization of the relays at selected speed levels might be utilized to energize different colored lamps in the locomotive cab. The use made of the output of function detectors 31, 32 does not form a part of the invention.

Figure 3B:
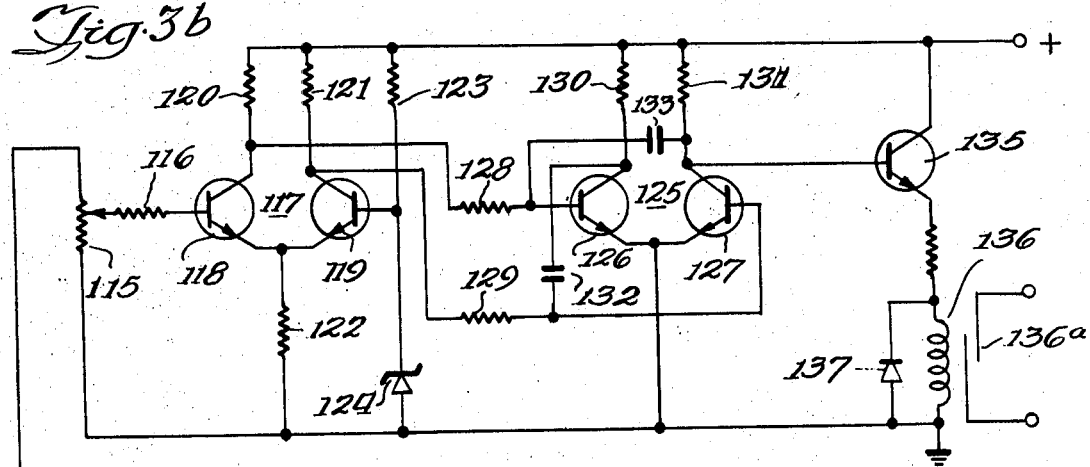
Figure 3B:
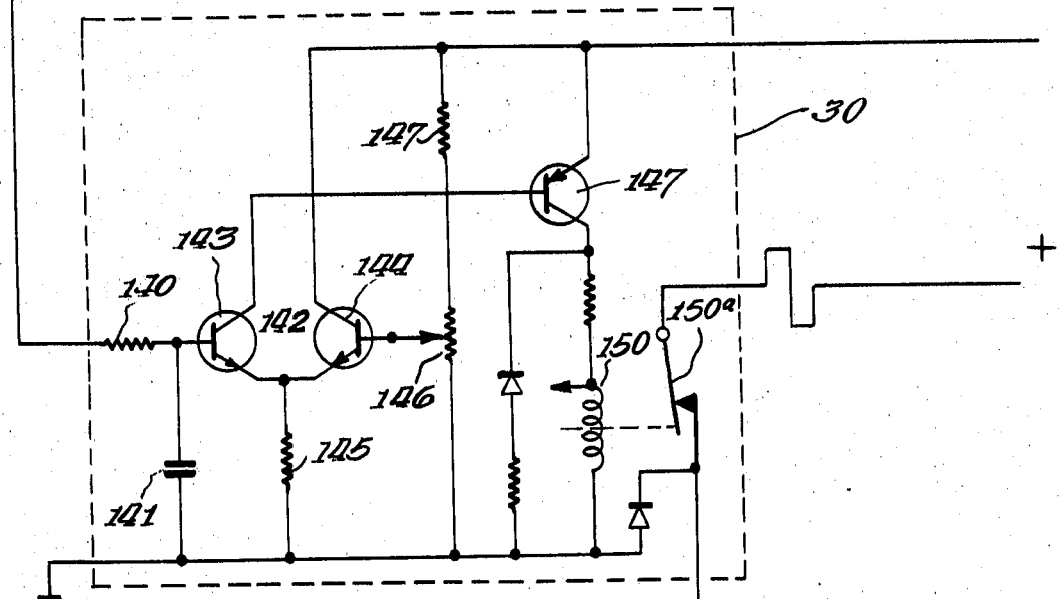
Figure 3B:
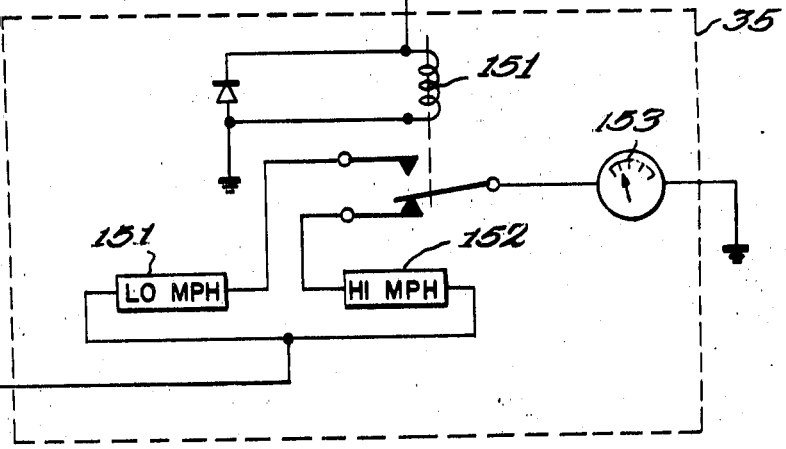

Turning now to FIG. 3 (made up of two portions, 3a and 3b), the circuit of the control system will be described in detail.

The magnetic pickup 20 includes a coil 40 and a polarizing magnet 41. The output of the coil is connected through a balanced circuit with the inputs of noise cancellation amplifiers 42, 43. Each section of the balanced line includes a low pass RC filter 44, 45 and bidirectional diode clamps 46, 47. The signals at the inputs to amplifiers 42, 43 are 180° out of phase with each other, and are relatively free of high frequency interference and voltage variations resulting from speed differences. The outputs of amplifiers 42 and 43 are connected in phase opposition so that the desired signal is additive in the output. Any interference components which are not equal and opposite at the inputs to amplifiers 42, 43 tend to cancel.

The two portions of the balanced input circuitry are identical and only one will be described. Low pass filter 44 includes a shunt capacitor 50, 0.005 µf., connected to ground, and a series resistor 51, 100 ohms. The reversely polarized shunt connected clamping diodes 46 may be type 1N2069. A series coupling capacitor 52, 10 µf., connects the signal to the base of transistor amplifier 42, 2N3568. The transistors are operated from a 20 volt source, not shown, connected with terminal 53. A series dropping resistor 54, 470 ohms, and a shunt connected Zener diode 55, 1N759A, establish a regulated 12 volt operating potential at conductor 56. The base of amplifier 42 is connected with the 12 volt source through resistor 57, 220,000 ohms. A balanced emitter-collector circuit includes resistor 58, 1000 ohms, connected between source 56 and the collector, and resistor 59, 1000 ohms, connected between the emitter and ground. The balanced output circuit for the noise cancellation amplifier includes a potentiometer 60, 15,000 ohms, connected with the collectors of transistors 42 and 43 through capacitors 61, 62, each 10 µf. The tap of potentiometer 60 is adjusted for proper balance of the output signal, compensating for any differences in the components of the two channels. A relatively noise-free rectangular wave 64 appears at the potentiometer tap. This signal has a frequency dependent on the rate of movement of the teeth of gear 19 past the magnetic pickup 20. If the teeth are uniformly spaced, the signal may be a square wave.

The signal 64 is direct coupled to a two-stage DC amplifier utilizing transistors 66 and 67, each 2N3568. The base of transistor 66 is connected with the 12 volt source 56 through bias resistor 68, 2200 ohms. The emitter is connected to ground through resistor 69, 180 ohms, and the output is derived from the collector across load resistor 70, 2200 ohms, from the collector to source 56, and connected to the base of transistor 67. The collector of transistor 67 is connected directly with source 56 and the output is derived from the emitter across load resistor 71, 1000 ohms, connected to ground.

The output of amplifier 67 is connected through a series resistor 72, 1000 ohms, and capacitor 73, 10 microfarads, to Schmitt trigger 26 which includes a pair of transistors 74, 75, each 2N3643. The operation of a Schmitt trigger is well known and will not be described here. The following resistors make up an operative circuit.

| | Ohms |
|---|---|
| 76 | 39,000 |
| 77 | 2,200 |
| 78 | 270 |
| 79 | 6,800 |
| 80 | 8,200 |
| 81 | 2,200 |

The output of the trigger circuit, appearing across resistor 81, is illustrated at 82. The signal is made up of a series of positive pulses, one for each positive excursion of signal 64, and of a constant width. The repetition rate, and thus the ratio of positive to negative pulse width, depends on the repetition rate of pulses 64. The negative going portion of signal 82 may be slightly rounded. Pulses 82 are connected through a high pass filter, series capacitor 85, 1000 pf., and shunt resistor 86, 2200 ohms, to a series diode 87, 1N456, which squares the bottom of the pulse.

The pulses 82 trigger monostable multivibrator 27, comprising transistors 90, 91, each 2N3643. The operation of such a multivibrator is well known and will not be described in detail. The circuit includes the following resistors.

| | Ohms |
|---|---|
| 92 | 2,200 |
| 93 | 2,000 |
| 94 | 2,200 |
| 95 | 1,200 |
| 96 | 1,000 |

Resistor 97, forming a voltage divider with resistor 95, to which base bias resistor 94 for transistor 91 is connected, is 36 ohms, with a negative temperature coefficient, to provide temperature stability for the multivibrator circuit.

The output pulse width of the multivibrator is determined by the value of coupling capacitor 98. For example, with a value of 0.1 µf., the output pulse has a width of 0.72 microsecond. For a capacitor value of 0.047 microfarad, the pulse width is 0.35 microsecond.

The multivibrator output signal 99, a series of positive pulses of fixed amplitude and pulse width with a repetition rate dependent on the frequency of the input signal (the speed being measured) are rectified by diode 100. A filter 101 smooths the pulses and provides a DC voltage input to a two-stage Darlington connected DC amplifier 102. Filter 101 includes a shunt capacitor 103, 0.33 µf., paralleled by the series combination of temperature compensating resistor 104, 500 ohms, and resistor 105, 1000 ohms. The filter is completed by series resistor 106, 3300 ohms, and shunt capacitor 107, 47 µf. The Darlington amplifier utilizes two transistors 108, 109, each 2N3568. The collectors of the two amplifier stages are connected directly with the voltage source and the emitters are connected through resistors 110, 111, each 10,000 ohms, to ground.

The remainder of the circuit is shown in FIG. 3b, which has two signal input connections, A and B, with the circuit of FIG. 3a. Connection A is to the output of AC amplifier 67 while connection B is to the DC output of amplifier 102.

The variable ratio rectangular wave generator 29 responds to the DC potential at B. The DC potential is connected through a speed setting potentiometer 115 and a series resistor 116, 4700 ohms, to one section of a comparison amplifier 117. The amplifier utilizes a pair of transistors 118, 119, 2N3643. The collectors of the two transistors are connected through load resistors 120, 121, each 1500 ohms, with a 24 volt source. The emitters are connected through a common resistor 122, 330 ohms, with ground. The speed representative DC bias potential is connected with the base of transistor 118 while the base of transistor 119 is returned to a reference established by series resistor 123, 4700 ohms, connected with Zener diode 124, 1N759A, to ground. The variable ratio rectangular wave generator is a free-running multivibrator 125, utilizing a pair of transistors 126, 127, each 2N3565. The resistances of comparison amplifiers 118, 119, which vary inversely with changes in the DC bias potential at B, are connected with the bases of transistors 126 and 127, respectively, controlling the timing ratio, but not the frequency, of rectangular wave generator 125. For a frequency suitable to operate valve 22, as of the order of ten cycles per second, the following circuit components are utilized.

Resistors:
    128—270,000 ohms
    129—100,000 ohms
    130—2,200 ohms
    131—2,200 ohms
Capacitors:
    132—1 μf.
    133—1 μf.

The output of transistor 127 is connected with a control transistor 135, 2N3638, which operates a relay 136 having contacts 136a which may control a power relay or hydraulic valve 22, directly. The diode 137 across the relay coil protects transistor 135 when the relay is de-energized.

Figure 4:
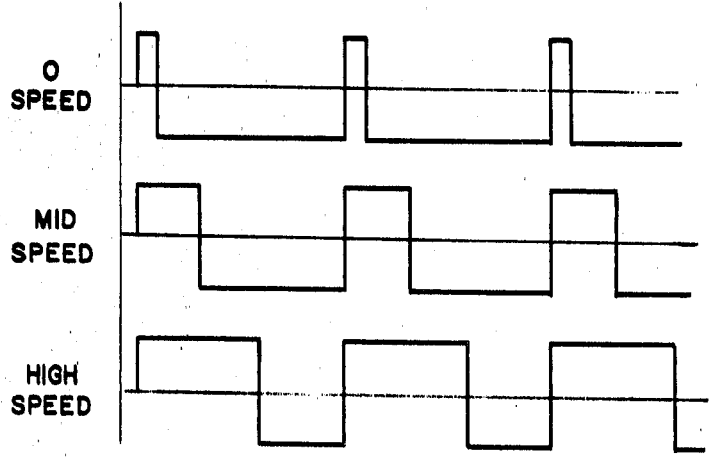
FIG. 4 is a set of curves illustrating operation of the variable duty cycle rectangular wave generator.

The timing curves of FIG. 4 illustrate the relationship of the rectangular wave generator operation to the speed being measured. At low speeds the output of the generator has a very short positive pulse followed by a long negative pulse. As the speed increases, the ratio of positive to neagtive pulse time increases. This timing variation is utilized to control valve 22 and regulate the speed. The setting of potentiometer 115 determines the speed at which a state of equilibrium is achieved in the system and may be calibrated directly in miles per hour. When this setting is changed, the locomotive accelerates or decelerates until equilibrium is again reached.

A representative circuit for a speed responsive function control is illustrated in the lower portion of FIG. 3b for the meter range control 30. The DC potential from point B is connected through a low pass filter network including series resistor 140, 7800 ohms, and shunt capacitor 141, 10 μf., to a comparison amplifier 142 utilizing a pair of 2N3565 transistors, 143, 144, with a common emitter resistor 145, 330 ohms. The speed responsive signal is connected to the base of transistor 143 while the base of transistor 144 is connected with a calibration potentiometer 146, 10,000 ohms, connected in series with a range establishing resistor 147. The following values for resistor 147 are used with the indicated speed ranges and are representative.

| Resistor value: | Speed, miles per hour |
|---|---|
| 47,000 | 18 |
| 34,000 | 32 |
| 22,000 | 40 |
| 10,000 | 83 |

The speed values, of course, depend on the ratio of pulse frequency to speed and may vary in different applications.

The collector circuit of transistor 143 is completed to the base of output transistor 147, 2N3638. When the speed being measured is less than that for which reference transistor 144 is adjusted, transistor 147 is cut off. As the speed increases, transistor 143 conducts more heavily, reducing the impedance between the base of transistor 147 and ground. When the speed reaches the set point, transistor 147 conducts. This energizes relay 150, opening its contact 150a and deenergizing meter relay 151 switching the meter circuit from the low range to the high range. The meter input is the amplified pulse signal appearing at point A, the output of amplifier 67, and is connected through one of the series range resistors 151, 152, with the AC measuring instrument 153.

As pointed out above, detectors 31, 32, etc., are similar in construction and operation to detector 30 and may be connected with the circuit to perform additional indicator or control operations.

FIG. 5 illustrates a modified input circuit utilizing an operational amplifier 160 in place of the dual transistor noise cancellation amplifier and Schmitt trigger circuit of FIG. 3. The output signal of pickup 40, which is approximately sinusoidal, is coupled through series resistors 161, 162, to a diode clamp 163. A rectangular wave 164 is coupled through series capacitors 165, 166, each 10 microfarads, and across an RC filter network 167 to the input of amplifier 160. In the particular circuit shown, an operational amplifier, RCA type CA3010 integrated circuit, is utilized. Resistor 168, 47,500 ohms, provides feedback with which amplifier 160 saturates on input levels of approximately 10 millivolts. This insures a clean rectangular wave output.

The output is developed across resistor 169, 2210 ohms, which is returned to a reference potential established at the resistors 170, 475 ohms.

We claim:
1. A speed responsive system, comprising:
    a magnetic pickup cooperating with a rotating magnetic element and providing a source of pulses, the frequency of which varies directly as a function of the speed of the element and subject to variation of pulse duration and shape with speed, said pickup having a pair of output terminals at which the pulses are in phase opposition;
    means defining a reference potential;
    a noise cancellation amplifier having a pair of inputs and a pair of related outputs, the signal produced at each output being directly related to the signal applied to the related one of said inputs;
    a pair of circuits each connecting one of said pickup output terminals with an input of said amplifier, said circuits being balanced with respect to said reference potential;
    means combining the signals produced at the outputs of said amplifier in phase opposition to produce a signal having a frequency dependent on the speed of said element and free of noise which is in phase at said amplifier inputs; and
    means, responsive to the output of the means for combining, providing an indication of the speed of the element.

2. The speed responsive system of claim 1 in which each one of said pair of circuits includes a low pass filter, reducing the relative amplitude of high frequency signal components.

3. The speed responsive system of claim 1 in which each one of said pair of circuits has a shunt limiter connected therewith establishing a maximum pulse amplitude.

4. The speed responsive system of claim 1 in which said noise cancellation amplifier comprises two amplifier elements each having an input and an output, one of said pair of circuits being connected with each input.

5. The speed responsive system of claim 1 in which said noise cancellation amplifier is an operational amplifier having an output balanced with respect to said reference potential.

6. In a speed responsive system:
    a source of pulses the frequency of which varies directly as a function of speed;
    means connected with said source for deriving from said pulses a DC potential the level of which varies with the frequency of said pulses and thus with speed;
    a source of comparison potential;
    a two-stage comparison amplifier, each stage having an input and an output;

means connecting the two stages of said comparison amplifier so that the impedance of each stage varies in one sense with respect to potential variations at the input of that stage and in the opposite sense with respect to potential variations at the input of the other stage;

means connecting the input of one of said stages with said source of comparison potential;

means connecting the input of said other stage with said direct current potential deriving means; and a rectangular wave generator having a duty cycle which is variable as a function of the output of said comparison amplifier, said generator including a two stage, free-running multivibrator, and means connecting the output of each stage of the comparison amplifier with a different one of the stages of the multivibrator, the variation of impedance of the stages of the comparison amplifier changing the timing relation of the multivibrator to provide an output signal of fixed frequency and a duty cycle which represents speed.

References Cited
UNITED STATES PATENTS

| | | | |
|---|---|---|---|
| 2,887,654 | 5/1959 | Strassman | 324—70 |
| 2,999,168 | 9/1961 | Henry | 324—78 |
| 3,018,381 | 1/1962 | Carroll | 324—78 |
| 3,170,104 | 2/1965 | Richards | 318—146 |
| 3,234,447 | 2/1966 | Sauber | 318—326 |
| 3,300,719 | 1/1967 | Thomas | 324—78 |
| 3,332,406 | 7/1967 | Perry | 317—5 |
| 3,335,349 | 8/1967 | Cooper | 318—318 |
| 3,350,637 | 10/1967 | Pochtar | 324—70 |
| 3,388,764 | 6/1968 | Wood | 317—5 |
| 3,414,771 | 12/1968 | Rosenberg | 317—5 |
| 3,418,528 | 12/1968 | Watanabe | 324—70 |

MICHAEL J. LYNCH, Primary Examiner

U.S. Cl. X.R.

317—5; 324—161

PO-1050
(5/69)

UNITED STATES PATENT OFFICE
CERTIFICATE OF CORRECTION

Patent No. __3,560,854__   Dated __February 2, 1971__

Inventor(s) __JOHN I. MOSS, FRED R. WRIGHT and WALTER JASKIEWIC__

It is certified that error appears in the above-identified patent and that said Letters Patent are hereby corrected as shown below:

Change the assignee from "John I. Moss, Inc., a corporation of Illinois" to -- John I. Moss --.

Signed and sealed this 15th day of June 1971.

(SEAL)
Attest:

EDWARD M. FLETCHER, JR.
Attesting Officer

WILLIAM E. SCHUYLER,
Commissioner of Paten